*INVENTORS*
JOHN R. WATSON
ROGERS T. STAFFORD
BY
*Barlow & Barlow*
ATTORNEYS

United States Patent Office
2,773,305
Patented Dec. 11, 1956

2,773,305

METHOD OF PRODUCING PIN STEM FINDINGS

John R. Watson, Bristol, and Rogers T. Stafford, East Providence, R. I., assignors to B. A. Ballou & Co., Incorporated, a corporation of Rhode Island Application November 18, 1953, Serial No. 392,898

6 Claims. (Cl. 29—558)

This invention relates to a finding for a pin stem and has to do with a method which may be used either for producing the pin stem joint, or a catch at the pointed end of a pin stem.

In the use of pin stem joints or catches, it is found advantageous in many cases to provide a stud extending downwardly from the base so that this stud may be molded into an ornament or other mounting rather than soldering the base to such ornament or mounting. In the forming of the catch from bar stock it is therefore customary to drill through the ears from one side completely through the other side to form the bearings for the rotary member. This provides a safety catch which is somewhat unsightly.

One of the objects of this invention is to provide a safety catch which will be of enhanced appearance.

Another object of the invention is to close one end of the bearing opening to enhance the appearance of the safety catch and also to provide a stronger safety catch.

Another object of the invention is to provide a safety catch which will have no raw edge at the location of the juncture of the bearing opening and the outer surface of the catch at this bearing opening.

Another object of this invention is to provide the safety catch by simplified steps in the formation of the same.

With these and other objects in view, the invention consists of certain novel features of construction as will be more fully described and particularly pointed out in the appended claims.

In proceeding with this invention, we start with bar stock and in a screw machine turn the bar so as to form one or more body members of a safety catch. We then bore at right angles to the axis of the catch to a point beyond the axis of the rod but not way through the body. We then slot the catch at right angles to the bore and along the axis of the catch, which would be complete if the structure is then to be used for a pin stem joint, but when used for a safety catch, the rotary keeper is assembled in the slot and then the body and the keeper are slotted so as to receive the pin stem that rotation of the keeper may lock the pin stem in the catch.

Figure 1:
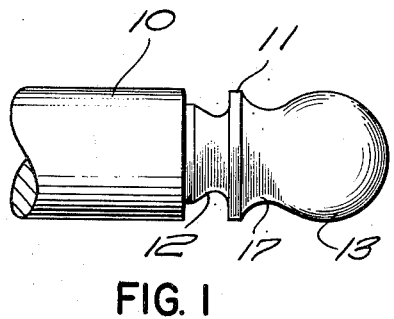
Figure 1 is a plan view illustrating a portion of a piece of rod stock which has been turned to form the body portion of a pin stem finding.
Figure 2:
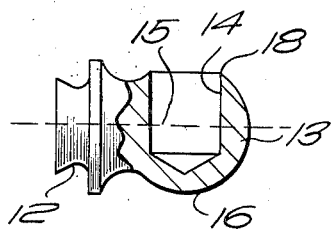
Figure 2 is an elevational view partly in section showing a bore formed in the body portion at right angles to the axis of the rod.
Figure 3:
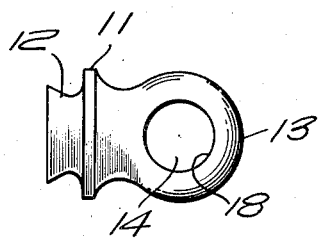
Figure 3 is a plan view of the structure shown in Figure 2 and looking into the bearing opening.

With reference to the drawings, 10 designates a portion of a solid rod from which the pin stem finding is to be formed with suitable tools, and in a turning operation we provide a shape such as shown in Figure 1, which comprises a base 11 with a stud 12 formed by shaping as shown on one side of the base with bulbous part 13 formed on the other side of the base, all of which we refer to as the body of the finding. The next step in the operation is to bore into the bulbous portion 13 and at right angles to the axis of the body and rod as at 14 to a position beyond the axis 15 but short of the opposite side 16 of this bulbous portion. This bulbous portion is illustrated as substantially a portion of a sphere with a neck 17 joining it to the base 11. The portion of the stock where the drill enters to form the bore 14 is removed, leaving a rather sharp edge as at 18 surrounding the bore. The next step in the operation is to provide a slot 19 which extends axially of the finding and at right angles to the axis of the bore 14, and at the same time as the slotting cutter enters to form a slot 19, a similar cutter will cut off the sharp corner 18 and provide a flattened portion 20 surrounding the edge of the bore as it enters from the generally spherical surface of the bulbous portion 13 of the body.

If the finding is to be used as a pin stem joint, a pin stem having suitable trunnions is positioned within the slot 19 with the trunnions extending at either side thereof in the bore 14 where it will be rotatably mounted.

Figure 4:
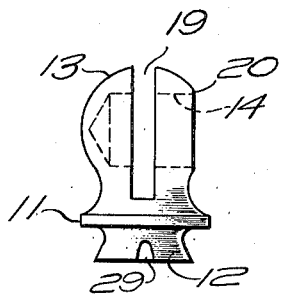
Figure 4 is an elevation showing the slot and cut at the juncture of the bore and outer surface of the body.
Figure 5:
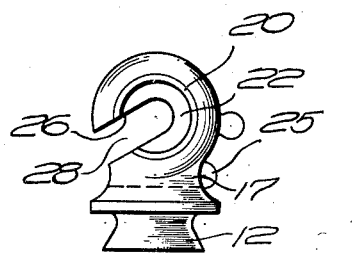
Figure 5 illustrates a rotary keeper in a safety catch as assembled in the end with a slot extending into both the body and the keeper.
Figure 6:
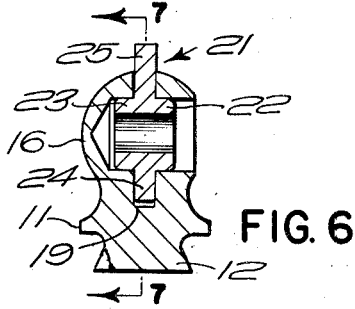
Figure 6 is a sectional view through the center of Figure 5.
Figure 7:
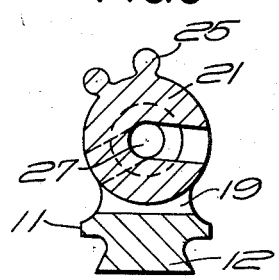
Figure 7 is a sectional view on line 7—7 of Figure 6.

If the structure as shown in Figure 4 is to become a safety catch, then a keeper designated generally 21 and having trunnions 22 and 23 is positioned in the bore 14 with its web portion 24 in the slot and with the trunnions 22 and 23 on either side of the slot and with the handles 25 engaging the neck portion 17 where the keeper will be located when in open position. A slotting tool is then used to form the slot 28 in the bulbous portion of the body and 26 in the keeper, the width of the slot being sufficient to receive or accept the pin stem and of a distance beyond the axis of the bore 14 sufficient to permit the pin stem to be centered with its axis on the axis of the bore in which position the rotor 21 may be swung from the position shown in Figure 5 to the position shown in Figure 7 so as to lock the pin stem within the opening 27.

In some cases, we may provide a recess or nick 29 in the stud 12 so that when the stud is molded into an ornament or base, it will be prevented from rotating therein.

A material will be used which will be sufficiently hard to resist opening up of the ears, and by provision of the closure at the portion 16 in the body, a nicely rounded catch on one side is provided and a catch which has increased strength at the bearing for the trunnion 23 of the rotary member which is received in position.

By provision of the catch in this manner, the slot 19 need only extend as far into the structure as is necessary and need not extend to the base or into the stud, which would occur should the catch be one folded up from flat stock.

We claim:

1. The method of producing a pin stem finding which comprises the steps of turning rod stock to form a finding body having a bulbous portion symmetrically disposed about the axis of the rod, drilling a hole in the bulbous portion at right angles to said axis partially through the bulbous portion and beyond said axis of a size so as to leave a substantial circular margin of the bulbous shape about the opening, slotting the bulbous portion along said axis at right angles to the axis of said bore and across said opening.

2. The method of claim 1 wherein the turning step shapes the body to form a base with a stud at one side of the base to be embedded in a cast metal.

3. The method of claim 1 wherein the turning step shapes the body to form a base with a stud at one side of the base and the bulbous portion on the other side of the base.

4. The method of claim 1 wherein during the slotting step, the stock at the outer edge of the bore is cut to flatten the same.

5. The method of claim 1 wherein a rotary member having trunnions is positioned in said slot with the trunnions extending into the bore on either side of said slot.

6. The method of producing a safety catch for a pin stem from rod stock which comprises the steps of turning the rod stock to form the body symmetrically disposed about the axis of the rod and having a bulbous portion, drilling the bulbous portion at right angles to said axis partially therethrough but beyond said axis and of a size so as to leave a substantial circular marginal edge about the opening, slotting the bulbous portion along said axis at right angles to the axis of said bore and across the same, positioning a rotary keeper in said slot with portions bearing in the bore at either side of said slot and slotting the body and keeper radially of the axis of said bore to a point intersecting the bore and of a dimension to receive a pin stem.

References Cited in the file of this patent

UNITED STATES PATENTS

| | | |
|---|---|---|
| 401,053 | Oppenheimer | Apr. 9, 1889 |
| 681,393 | Hawver | Aug. 27, 1901 |
| 1,148,855 | Peters | Aug. 3, 1915 |
| 1,635,188 | Morehouse | July 12, 1927 |
| 2,105,618 | Silva | Jan. 18, 1938 |
| 2,109,969 | Dzus | Mar. 1, 1938 |
| 2,123,985 | Ballou | July 19, 1938 |
| 2,186,682 | Morehouse | Jan. 9, 1940 |
| 2,213,040 | Drissner | Aug. 27, 1940 |
| 2,477,607 | Hungate | Aug. 2, 1949 |